Oct. 5, 1954  G. B. THOMAS  2,690,673
INERTIAL MARKING DEVICE FOR SUBSURFACE GAUGES
Filed Jan. 24, 1949  4 Sheets-Sheet 1
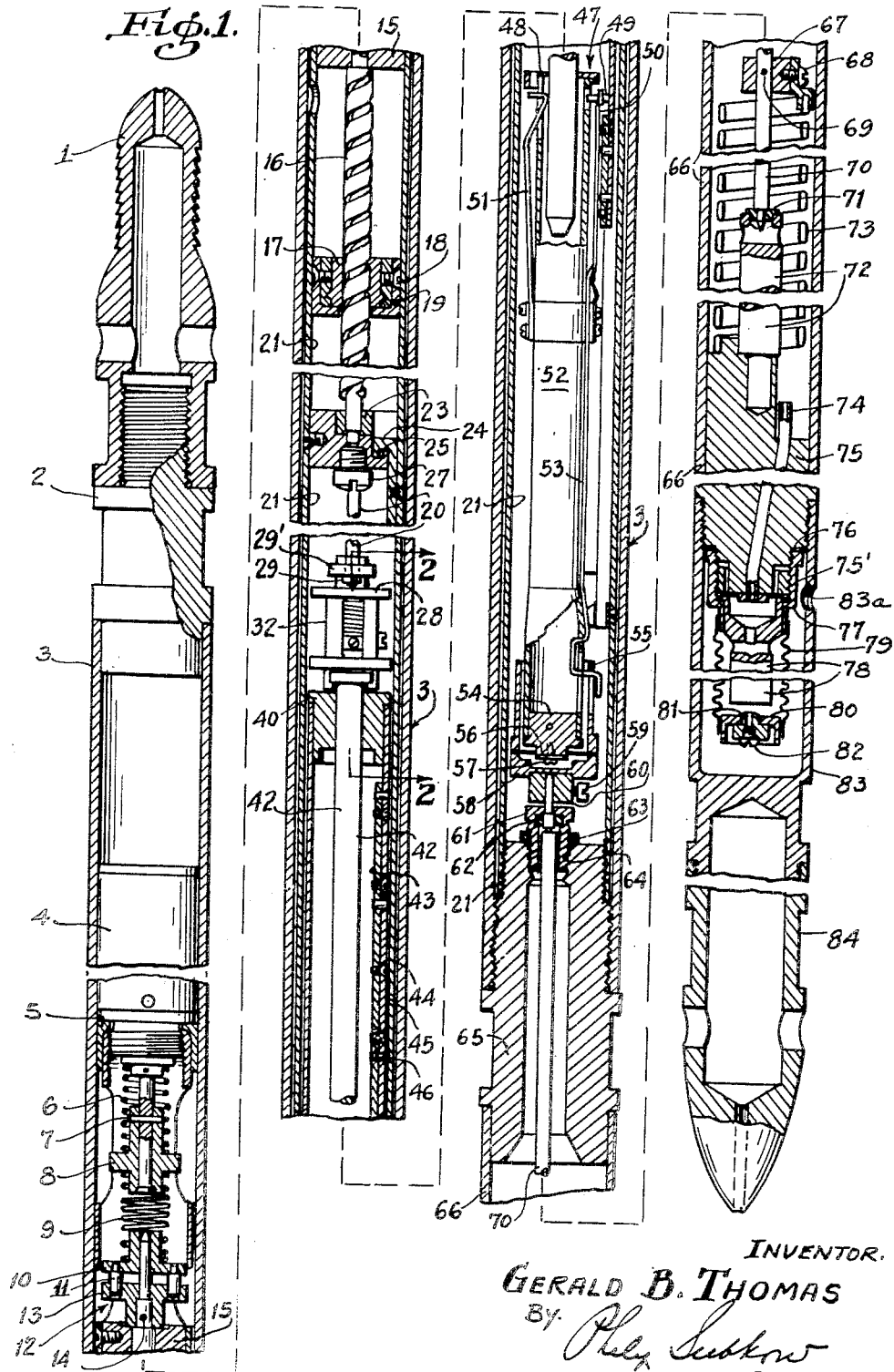
INVENTOR.
GERALD B. THOMAS
BY
ATTORNEY.

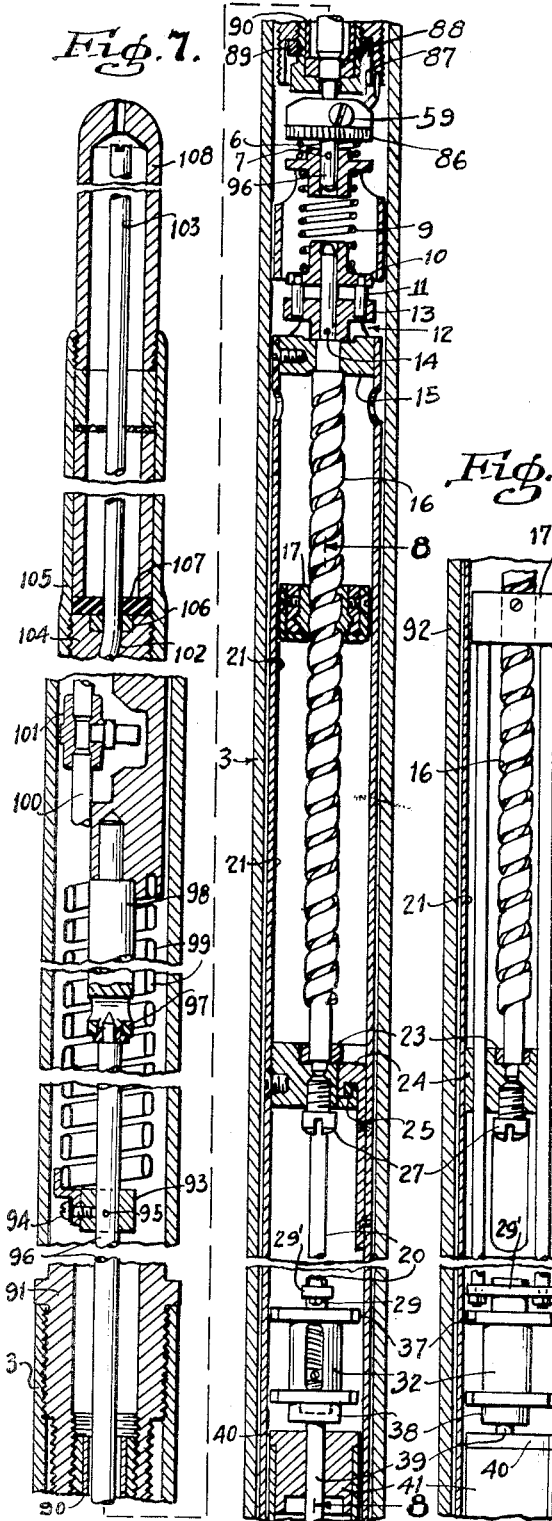
Oct. 5, 1954  G. B. THOMAS  2,690,673
INERTIAL MARKING DEVICE FOR SUBSURFACE GAUGES
Filed Jan. 24, 1949  4 Sheets-Sheet 2
INVENTOR.
GERALD B. THOMAS
BY
ATTORNEY.

Oct. 5, 1954 — G. B. THOMAS — 2,690,673
INERTIAL MARKING DEVICE FOR SUBSURFACE GAUGES
Filed Jan. 24, 1949 — 4 Sheets-Sheet 3
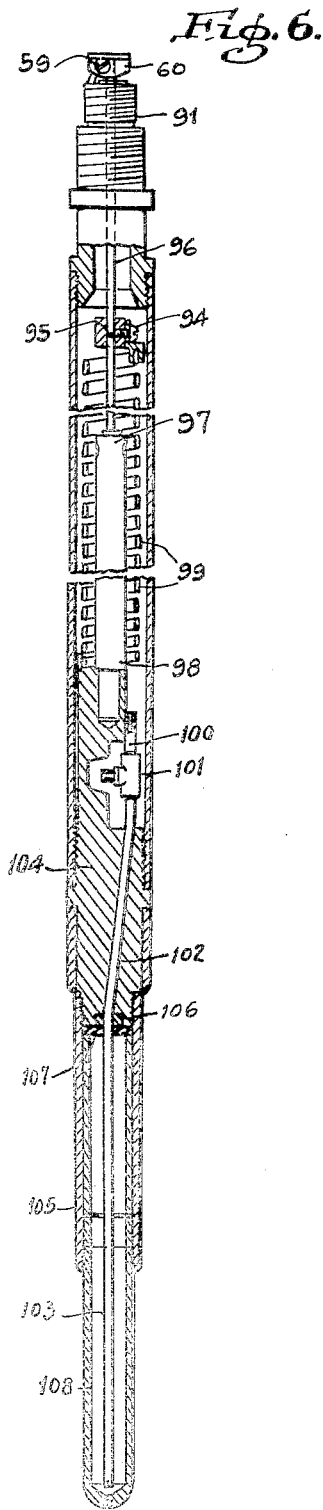
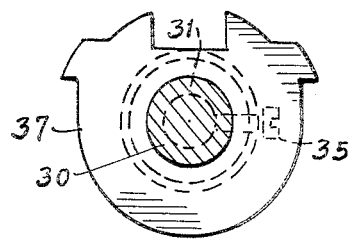
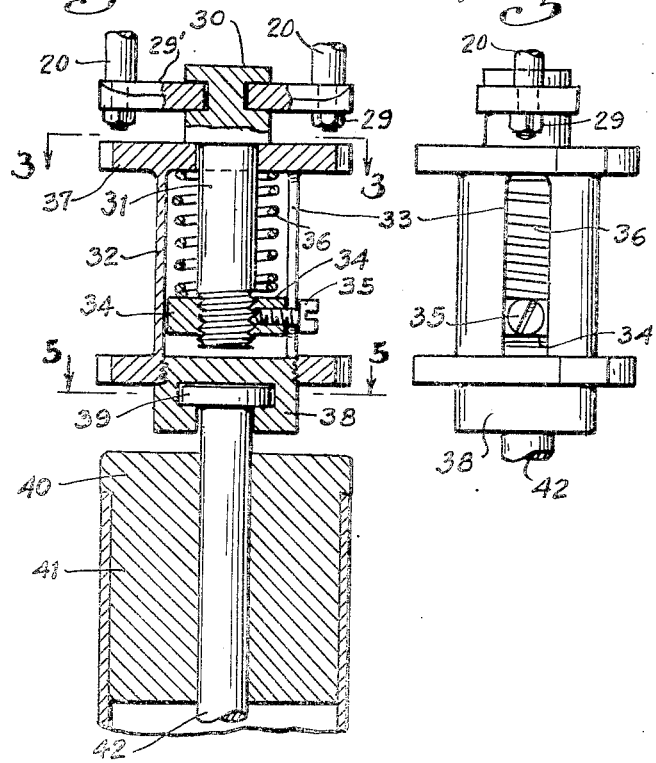
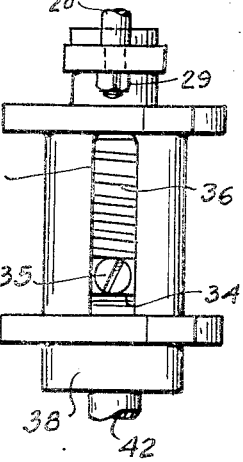
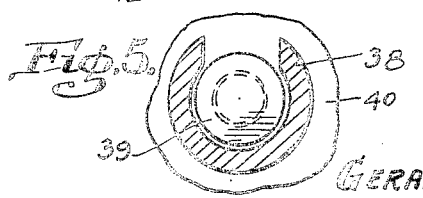
INVENTOR.
GERALD B. THOMAS
BY
ATTORNEY.

Oct. 5, 1954     G. B. THOMAS     2,690,673
INERTIAL MARKING DEVICE FOR SUBSURFACE GAUGES
Filed Jan. 24, 1949     4 Sheets-Sheet 4
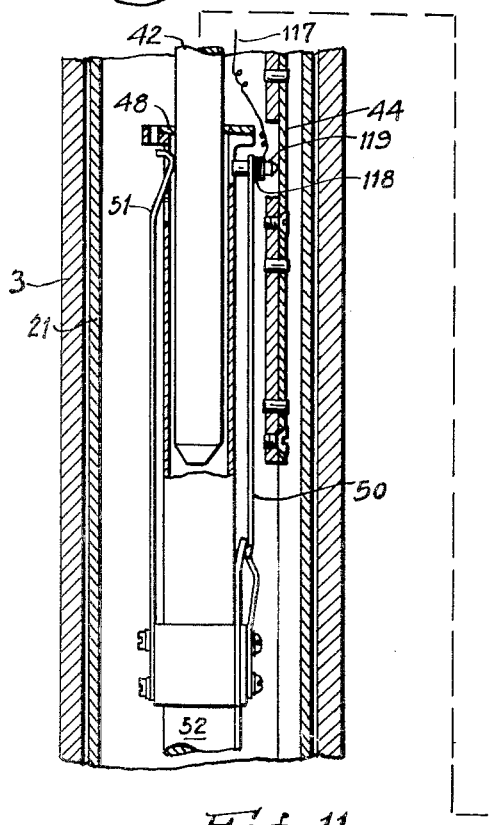
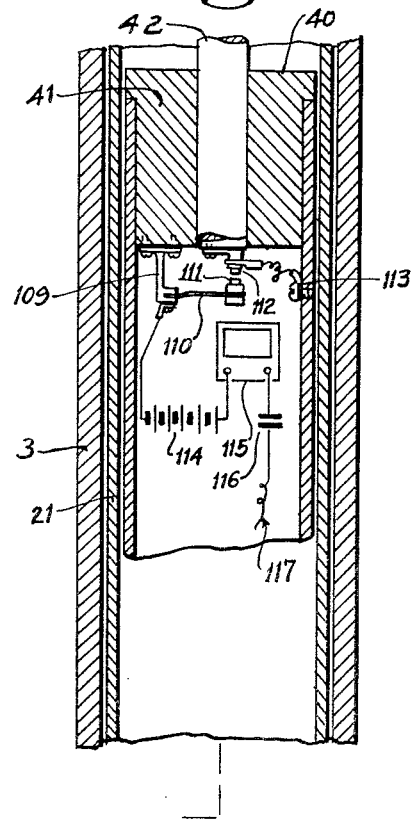
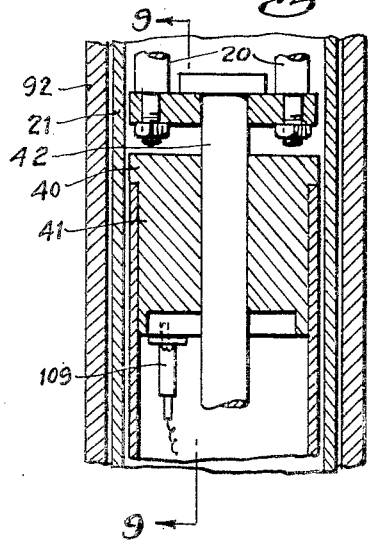
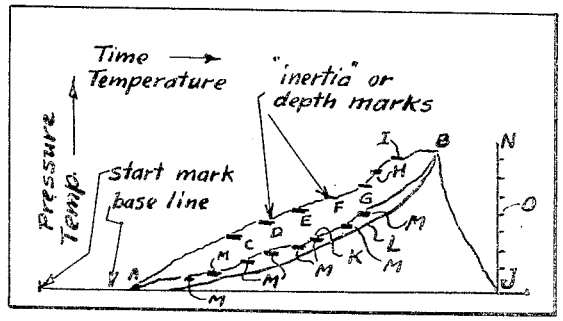
INVENTOR.
GERALD B. THOMAS
BY
ATTORNEY.

Patented Oct. 5, 1954

2,690,673

UNITED STATES PATENT OFFICE 2,690,673

INERTIAL MARKING DEVICE FOR SUBSURFACE GAUGES

Gerald B. Thomas, Los Angeles, Calif., assignor to Signal Oil and Gas Company, Los Angeles, Calif., a corporation of Delaware Application January 24, 1949, Serial No. 72,450

23 Claims. (Cl. 73—345)

This invention relates to devices for performing surveys in bore holes drilled into the earth, and more particularly in bore holes extended for the production of petroleum or gas from the earth.

As is generally known, it is common practice to determine the physical characteristics of the bore hole and of the earth's environment by lowering an instrument into the bore. Such instrument may measure pressure, temperature, radio-activity, densities of the fluid in the bore hole, rate of flow of fluid in the bore hole, the point of entrance of fluid, such as gas or water, or the geographical position of the bore hole, or may be used for the purpose of obtaining other information. These instruments may be of the single shot variety which are lowered to a known depth in the bore hole and recovered from such depth, a single record being made at one depth. They may be of the traverse type i. e., whereby they are lowered into the bore hole, and the characteristics recorded at varying depths, but in all such cases the record obtained must be correlated with depth.

The object of my invention is to devise an instrument which will be self-contained and which will produce a recognizable mark on the record of the physical characteristics made by the instrument and which mark may be correlated with depth.

In the prior art, the recognition of the depth in the traverse type of instrument in which any record of the measured physical characteristic and its variation with depth is made by recording this variation as a function of time of traverse of the instrument. By recording simultaneously time and the measured characteristic, a trace is obtainable which is a function of both time and the characteristic. The time function is obtained usually by means of a clock which is set in motion as the instrument is let into the well. Time is also recorded at the surface as is also the depth by means of measuring the length of line passed out in lowering the instrument, said length being correlated with the time interval of the lowering process. Thus, knowing the depth obtained at any time interval of the lowering, the same interval may be read from the trace and the magnitude of the characteristic recorded and such time interval on the instrument is readable from the record.

In this procedure there is always an interval of time between the starting of the clock and the start of the lowering process. This is occasioned by the fact that the instrument must be in partly disassembled condition when the clock is started. Then the instrument is assembled and introduced into the well, adjustments made, and the lowering started. Time is kept at the surface of the duration of this procedure and a correction must be made by measuring back on the record the recorded time, and, by interpolation on the record, determining the value of the recorded characteristics at the corrected time corresponding to the depth recorded at the surface for such time.

Additionally, temperature in bore holes increases with depth, and the driving mechanism connecting the clock and recording mechanism is affected by such temperature and introduces an important error in the recordation of the time function in the instrument. In other words, the clock record in the instrument is out of step with the clock record at the surface so that it cannot be said with certainty that the interval of time recorded by the clock in the instrument is the same as that recorded by the clock at the surface.

In order to avoid such uncertainties, it is often the practice to stop the descent of the instrument for a recorded period of time at successive depths the value of which is known from surface measurements. Where the characteristics recorded change progressively with depth, the stopping of the instrument at a known depth for a short time will produce a plateau in which such characteristics do not change with time. This will permit of a check on the depth measurement and of a correlation and correction of clock timing with depth. This procedure has the disadvantage that it introduces an undesirable delay in the traverse.

In another method the instrument is lowered to a series of depths, measured by recording the amount of lowered line, and allowed to come to rest at each depth so that equilibrium is established. No effort is made to take the measurements between such depths. In other words, the clock merely acts to cause an advance of the chart so that a trace can be made. The chart between the stopping point is ignored, and since the number of stops made and the corresponding depth at each succeeding stop is known, the actual depth at each plateau is known and the magnitude of the recorded characteristic at each plateau may be measured from the chart.

It will be recognized that in order to make a determinable plateau, a significant time interval must be allowed at each stop. This makes it impracticable, especially in deep bores, to make the interval between stops small so that frequently significant variations of the characteristics between stops are missed.

The correlation method has the difficulty arising from the indeterminacy of the effect of temperature on the clock mechanism or, in the case of pressure measurement, on the pressure recordation, and in the case of the step method the value of the characteristics between the stops is not obtained.

There is another difficulty with this step method in the failure to record the characteristics as a continuous variable of the depth or time, arising from the appreciable interval between stops which practical considerations require. Frequently it is essential to obtain immediate results of the traverse and to obtain a continuous record of the variable characteristics. This is illustrated by the use of thermometric (temperature) traverses to obtain the location of the top of the cement in bore hole cementing operations. Thus, when cementing, it is important to know the location before the cement is set so that if it is at an insufficient height additional cement may be introduced to raise the cement level. The thermometric survey indicates the top of the cement by the substantial temperature change resulting from the heat of setting of the cement. If the clock method of recording depth is used and a continuous traverse is made, the thermal lag may give an inaccurate trace and the time of computing correction factors for the clock mechanism operation may be so long as to make this method impracticable. When using the step method there is the danger that the top of the cement (whose position is unknown) will be missed.

I have devised a mechanism which obviates these difficulties and permits a recordation of a mark which is correlatable with depth without any substantial interruption of the progress of the traverse. The instrument may be lowered at the desired rate to obtain a continuous record under equilibrium conditions so that the trace of the recorded characteristics is a true record thereof. I superimpose on such record a mark which is correlatable with depth measured on the line and does not require any recordation of the time interval involved.

In a preferred embodiment of my invention I introduce an inertially operated device which actuates a recording mechanism. In my preferred embodiment, I employ a resiliently suspended mass, which mass may be the instrument or a portion thereof or a separately suspended mass. By suddenly stopping, accelerating or decelerating the descent of the instrument, the variation in acceleration actuates the inertial device so as to make a mark. Since I may so stop, accelerate, or decelerate the device as frequently as I wish and since the interval of descent during such stoppage, acceleration or deceleration may be made as short as desired or even reduced to zero, i. e., by stopping the instrument, I may make as many such marks as I wish and thus obtain an accurate record of the variations of the characteristics with depth and, of course, record the depth, i. e., length of passed out line at each point of such acceleration or deceleration.

Since I no longer rely on the clock to give me a time component to the chart record, I may actuate the recording mechanism by any other variable characteristic which changes with depth in the bore hole. This permits me to simultaneously record any two of the depth variable characteristics in the bore hole, as, for example, record simultaneously pressure and temperature. I obtain the record of depth by means of my inertially actuated marking device which marks the chart at the various depths at which it is actuated as referred to above.

This is particularly important when the response of the instrument to one of the variables is affected by the magnitude of the other recorded variable. Thus, for example, the response of the pressure gauge is affected by temperature and is usually calibrated for this purpose at the surface. It is thus necessary, if we are to correct any pressure reading for temperature to know the temperature at the depth at which the pressure record is made.

I am enabled, by reason of the fact that the recording of the depth is made independently of the recording of the pressure and temperature, to make a continuous traverse during which the record is made under temperature and pressure equilibrium to obtain a continuous and accurate trace of the variation of temperature and pressure as the instrument is lowered and also to mark, as frequently as desired, the depth record on the same record.

Because, as is well known to those skilled in the art, the temperature may not be a continuous function of depth, due to local variations in thermal gradient, it is particularly desirable to have a continuous trace of the actual variation of temperature. My device permits of such continuous trace of the temperature and the other recorded variable (e. g. pressure) function and the recording of the depth mark at close intervals of the depth measurements.

I may, especially where a single characteristic varies continually with depth, record only such characteristic as a straight line and employ the marking device to make a mark thereon which is correlatable with depth.

These and other objects of my invention will be understood from the further description of the preferred embodiment of my invention taken together with the drawings, in which Fig. 1 is a vertical part section of my device as applied to a sub-surface pressure gauge;

Fig. 2 is a part section taken on line 2—2 of Fig. 1;

Fig. 3 is a section taken on line 3—3 of Fig. 2;

Fig. 4 is a side view of Fig. 2;

Fig. 5 is a section taken on line 5—5 of Fig. 2;

Fig. 6 is a vertical section of a thermometer element which may be replaced for the pressure element of Fig. 1;

Fig. 7 is a vertical section of a combined pressure and pressure and temperature recording gauge employing the pressure marking device of my invention;

Fig. 8 is a view taken along line 8—8 of Fig. 7;

Fig. 9 is a modification of the inertial marking device, showing an electrically operated inertial marking device;

Fig. 10 is a modification of the stylus recording mechanism;

Fig. 11 is a sectional view of Fig. 9, Fig. 9 being taken along line 9—9 of Fig. 11;

Fig. 12 is a record such as one employing the device of my invention.

The end piece 1 is attached to the lowering line and is mounted upon the housing cap 2 which is in turn removably connected to the outer housing 3 in which is mounted the clock 4 upon a guide ring 5. The clock spindle is connected through a coupling spring 6 and a pin 7 to the coupler 8.

which is in turn connected through the clutch spring 9 and upper clutch 10 and lower clutch 13 by means of clutch pin 11. This drives the lead screw assembly 12, the lower clutch plate 13 being connected to the lead screw by a pin 14. The lead screw 16 operates in a nut 17 mounted in the inner housing 21 and in the lead screw bearing 15, the nut 17 being mounted in the nut cup 19 by means of the screw 18. The lower end of the screw 16 operates in the bearing 23. Push rods 20 connected to the cup 19 pass through the bearing 23 and are connected to chart holder lift 29. The bearing 23 has an adjustment screw 27. The inner housing 21 is held in position by the cover catch 25 and cover latch 24. Push rods 20 are connected to the chart holder lift 29'. The inertial unit 32 carries a nut 30 which may be slid into position into the receiving slot of the chart holder lift 29' and a rod 31 connected thereto on which is mounted a spring retainer 34 passing through a suitable bore in the head 37 into the interior of the cylinder 32. A positioning screw 35 is mounted in the head 34 and passes through slot 33 in the side wall of the cylinder 32. The spring 36 is positioned between the spring retainer 34 and the head 37 of the inertial unit 32.

The bottom of the cylinder 32 is closed with a nut retainer 38 provided with a T-slot into which the nut 39, mounted on the guide 42 positioned in the top of the chart holder 40, is introduced. The cylindrical chart holder 40 has a chart holder end 41 and a stylus arm guide 42 mounted in the chart holder end 41 and depending therefrom. The chart guide 43 is provided for the mounting of a suitable record chart upon which the stylus 49 may mark the necessary record. The chart holder tube 44 which carries the record on the interior thereof is centrally positioned by the chart holder spring 45 held by the screw 46. The stylus assembly 47 is composed of a stylus bearing 48 through which the stylus arm guide passes to centrally position the stylus arm 52. The stylus 49 is mounted upon a spring 50 which is connected to the stylus arm 52. A centralizing spring 51 is also provided. The stylus arm 52 is connected to stylus lift 53 positioned on the stylus arm plug 54. The stylus arm 52 is closed at the bottom end by the stylus arm plug 54 to which is connected the washer 56 by means of the screw 57. The stylus arm support 58 is clamped to the stylus shaft 70 by means of the stylus arm clamp 60 and the stylus shaft 70 is rotatably mounted in the jewel 62 held in place by the lock nut 63. The top of the housing coupling 65 carries the jewel 62 through which the stylus shaft 70 passes.

The lower end of the stylus shaft 70 is mounted in a stylus shaft bearing 71 on the top of the stylus shaft support 72 which is connected to the element base 75.

The Bourdon coil 73 is clamped at the top end thereof by means of the shaft connector pin 69, in collar 67, and the screw 68. The lower end of the tube is connected to the pressure tube 74 passing through the element base 75 and in turn connected to the interior of the pressure responsive diaphragm or bellows 79 which is mounted upon the element base 75 by means of gaskets 76 and the bellows adapter 75', the interior of the bellows forming a fluid pressure chamber having a bellows spacer 78. The lower end of the bellows 80 is closed with a filler plug 81 and a screw 82. The bellows is filled with a fluid which is employed to transmit the pressure. Surrounding the bellows and connected to the element base 75 is an oil trap 83 having at its upper end a vent 83a connecting the oil trap and the exterior of the instrument. Connected to the end of the oil trap 83 may be a container 84 in which a thermometer may be mounted if desired.

It will be observed that the clock in 4 rotates the lead screw 16 through the coupling and clutch assembly 6 to 13 inclusive. The rotation of the screw causes the nut 17 to descend, lowering the push rods 20 which permit the chart holder to travel downward on the arm guide 42 inside of of which enters the stylus arm. The descending chart passes downward over the stylus 49. It will also be observed that the axis of the spring 36 is parallel to the line of descent of the chart holder. With the instrument descending in the hole, in a generally vertical direction, the axis of resilient suspension and the relation of the center of the suspended mass to the spring permits of the relative movement of the resiliently suspended chart holder and the stylus parallel to the line of descent of the whole instrument, when this movement is accelerated, decelerated, or suddenly stopped.

The imposition of pressure through the port 83a causes the bellows 79 to contract, exerting a pressure through the tube 74 into the interior of the flexible tubular helical coil 73. The coil is thus caused to unwind and in unwinding rotates the stylus shaft 70, causing the stylus support 58 to rotate, thus rotating the stylus arm 52 and causing the stylus 49 to move circumferentially over the chart in position on the chart holder tube 44. As the instrument is lowered into a bore hole by means of the line connected to end piece 1, the clock thus causes time to be recorded along the length of the chart tube and pressure is recorded along the circumference of the chart tube by the rotation of the stylus.

It will be observed that the chart holder 41 is resiliently mounted on the push rods 20, a resilient mounting being via the spring 36. If, therefore, the descent of the tube is suddenly checked the inertia of the descent in the mechanism below the top of the plate 37 of the inertial unit 32 will cause the spring to be depressed and when the deceleration has stopped the spring 36 will rebound, thus causing the chart to make an oscillation or jog in the record. This may be done by either suddenly stopping the descent or suddenly bouncing the unit by putting a sudden upward pull on the lowering line. Fig. 12 illustrates the form of the chart which is thus obtained.

The chart from A to B indicates the variations of pressure or temperature with time, time measuring along the horizontal, and pressure, depending on whether the pressure or temperature gauge is employed (see below), being measured vertically, resulting from the rotation of the chart holder by means of the Bourdon screw. The joggles C, D, E, F, G, H, and I indicate the period at which the instrument has been jounced or during which the inertial marking device has operated. The record at the surface at which these joggles C, D, E, F, G, H, and I, in terms of the length of line passed out into the bore hole, will indicate the depth at such points C, D, E, F, G, H, and I. The traverse thus gives not only the actual value of the pressure at such points, but the pressure gradient between A and C, C and D, D and E, E and F, G and F, G and H, and H and I. The portion of the curve from B to J is merely the rapid return of the unit to the surface, during which pressure equilibrium was not established, indicating the rapid return of the unit at much greater time rate than during the descent A to B.

This device can be converted to an inertially operated temperature-depth recording unit by unscrewing the housing coupling 65 from the housing 3 and withdrawing and lifting the housing until the nut 59 is unscrewed from the stylus arm 60 by inserting a screw driver through a suitably provided port in the lower end of the inner housing 21. The inner housing 21 is unscrewed from the coupling 65 and the pressure unit, including the housing 65 and the shaft 70, is withdrawn from the stylus arm clamp 60. The unit shown in Fig. 6 is then introduced in place of the pressure unit. The inner housing 21 is screwed onto the housing coupling 91. The clamping screw 59 is screwed in, clamping the clamp 60 upon the stylus shaft 96 and the outer housing 3 is screwed onto the coupling 91. The stylus shaft 96 is mounted in jewel assembly, which is of the construction shown in Fig. 1 and will not be repeated, and comprises a jewel screw 87, a jewel 88, a jewel lock nut 89, and a jewel retainer 90 similar to those similarly numbered and previously described in the form shown in Fig. 1.

The stylus shaft 96 passes through the bore in the housing coupling 91 and is pivotally mounted upon the stylus shaft support 98 upon the stylus shaft bearing 97. The stylus bearing support 98 is mounted upon the element base 104. The pressure coil 99 in the form of a flat flexible tubular helical coil is connected at one end to the collar 93 mounted upon the stylus shaft 96 by means of the screw 94 and the shaft connector pin 95. The other end of the coil is connected to the pressure tube 100 which is connected through the intermediary of coil connector 101, having a closeable tube 102, to the pressure tube 103 passing through the element base 104 and projecting into the bulb 108 by means of the vapor tube 103. The bulb 108 is mounted upon the element base 104 by means of sleeve 105 and bushing 106 and the insulating gasket 107.

The device operates in the same manner as the device shown in Fig. 1. In this case the expansion of the pressure coil results from the heat imparted into the bulb which causes a generation of vapor and the expansion of the tube which is in proportion to the temperature. The device is thus a thermometer and the expansion of vapor due to the temperature measured causes the expansion of the coil 99 and the rotation of the shaft 96 and the rotation of the stylus in the same manner as did the expansion of coil 73 in Fig. 1.

In Fig. 7 is a modification of Fig. 1 in which in place of the clock mechanism to rotate the lead screw to advance the chart holder I employ a thermometric motor which may be the thermometer unit of Fig. 6. It will thus be seen in this Fig. 7 that the numbers have the significance of the numbers recited in Figs. 1 and 6.

The shaft 96 which projects through and is rotatably mounted in the jewel 88 is connected to the spring coupler 6 of Figs. 1 and 7 by means of the coupler pin 7. The rotation of the shaft 96 as the result of the expansion of the tube 99 in Fig. 7 causes the rotation of the screw 16 and the advance of the nut 17 and of the push rods 20 in the same manner as the action of the clock 4, but with this difference, instead of the advance being proportional to time, it is proportional to temperature. The record made is similar to the record shown in curve K made during descent and L made during ascent with the inertial marks M. The horizontal component abscissa is temperature and the vertical, i. e., the ordinant, is pressure.

The inertial device acts in this structure in the same way as it does in Fig. 1 and the horizontal lines C, D, F, G, H, I, and M have the same significance. In other words, they are occasioned by the sudden acceleration or deceleration of the descent of the unit or the joggling thereof and are correlated with depth by the recordation of the depth at which such joggles or marks are made.

Figs. 9, 10, and 11 show a modification of the inertial marking device in which the inertial device is electrical instead of mechanical. Underneath the chart holder end 41 and to one side of the stylus arm guide 42 is an inertial make-and-break switch mounted on bracket 109 and insulated from the chart holder end. In the bracket 109 is a leaf spring 110 upon which is mounted a contact 111 which cooperates with the contact 112 and mounted upon the chart holder end, and grounded at 113. In this space is mounted a small battery 114 such as is used in a hearing aid and a buzzer coil 115 which is connected through a condenser 116 to the stylus 119 by an electrical connection 117, the stylus being insulated from the stylus spring 50 by the insulating button 118. The action of the device will be apparent from what has been said before. By suddenly accelerating or decelerating the unit or joggling it the spring 110 is caused to vibrate and make and break contact between 111 and 112. This causes the spark to jump between the stylus point 119 and the chart holder 44, causing the spark to puncture the paper which is inserted to receive the record, making the mark in the appropriate place on the curve in the place of the joggles C to I, inclusive.

As a further modification of my invention, and because I am able to mark upon the record a mark which is correlatable with depth, recorded at the surface, I may omit from the instrument the screw 8, the clock mechanism, and all the mechanism for driving the screw from the clock, and also the rod suspension 20 and the nut 17. I may thus suspend the rod 31 of the inertial marking device in the case by a suitable mechanical connection thereof to the case. In such case the chart holder 44 will not be moved downward during descent. The temperature and pressure, depending upon whether the temperature or pressure gauge is employed, will be recorded on the chart circumferentially thereof. When the chart is then opened the record will be a straight line, for example, J and N (Fig. 12). Since the instrument is calibrated, any position on the straight line measured from the zero ordinate will be a record of pressure at that point. Therefore, by actuating the inertial device in the manner described above either electrically or mechanically a discernible record O will be made on that line marked by the stylus, which is correlatable with depth because of the record kept at the surface. Since the pressure at the point at which any such mark is made can be read from the chart there will be a record of the pressure at such depth. By plotting that record upon Cartesian co-ordinants, plotting pressure on one ordinate and depth on the other ordinate, I can derive a line from which not only the absolute pressure or temperature at any depth, but also the rate of change of pressure will be given as a function of depth.

While I have described a particular embodiment of my invention for the purpose of illustration, it should be understood that various modifications and adaptations thereof may be made within the spirit of the invention as set forth in the appended claims.

I claim:

1. A subsurface bore hole instrument, comprising a case adapted to be lowered into a bore hole, a pressure responsive flexible diaphragm, a carrier for supporting a chart, a marking stylus for said chart, means for actuating said stylus upon deflection of said diaphragm, independent means for moving said carrier with respect to said stylus, means for resiliently suspending the chart carrier, and means for effecting an oscillation of the chart carrier on the resilient suspension to impress a distinctive marking upon the chart.

2. A subsurface bore hole pressure gauge, comprising a case adapted to be lowered into a bore hole, a flexible diaphragm in said case, a fluid pressure chamber closed by said diaphragm, a port connecting one side of the diaphragm and the exterior of the case, a flexible fluid pressure transmitting tube connected to said fluid pressure chamber, a marking stylus connected to said tube, a chart holder for carrying a chart in operative association with said stylus, means for resiliently suspending said chart holder, means for independently moving said chart holder with respect to said stylus, and means for effecting an oscillation of said chart holder on the resilient suspension to impress a distinctive marking upon the chart.

3. A subsurface bore hole temperature gauge, comprising a case adapted to be lowered into a bore hole, a thermometric bulb in said case, an expansible tubular coil connected to said bulb, a stylus connected to said coil, a chart holder for carrying a chart in said case in operative association with said stylus, means for resiliently suspending said chart holder, means for independently moving said chart holder, and means for effecting an oscillation of said chart holder on the resilient suspension to impress a distinctive marking upon the chart.

4. A subsurface bore hole instrument, comprising a case, a clock means at one end of said case, a screw, connections for rotation of said screw by said clock means, a travelling nut on said screw, a chart holder, a resilient suspension between said chart holder and said nut, a stylus in operative relation to said chart holder, and a pressure responsive element in said case connected to said stylus.

5. A subsurface bore hole instrument, comprising a case, a clock chamber at one end of said case, a clock in said chamber, a screw, connections for rotation of said screw by said clock, a travelling nut on said screw, a chart holder for carrying a chart, a resilient suspension between said chart holder and said nut, a stylus in operative relation to said chart holder, a temperature responsive element in said case connected to said stylus, and means for effecting an oscillation of said chart holder on said resilient suspension to impress a distinctive marking upon the chart.

6. A subsurface bore hole instrument, comprising a case adapted to be lowered into a bore hole, a condition responsive device in said case responsive to a condition in the bore hole, a recording means positioned in said case, a mass positioned in said case, means for moving said mass relative to the case, said last-named means being operative from the surface, said recording means including a stylus and a chart holder for carrying a chart, means for holding said stylus in marking relation to said chart, a motion transmitting connection between said recording means and said condition responsive device for making a continuous record of the condition measured by said condition responsive device, and means for effecting relative motion between said stylus and chart holder independently of said condition responsive device, said recording means also including means responsive to motion of said mass relative to the case for effecting movement of said stylus over said chart independently of the relative motion of said stylus and chart holder responsive to said condition responsive device and independently of the aforementioned means for effecting said relative motion for making a distinctive marking on the chart to provide a correlation with said condition.

7. A subsurface bore hole instrument, comprising a case adapted to be lowered into a bore hole, a pressure responsive device in said case, a recording means positioned in said case, a mass positioned in said case, means for moving said mass relative to the case, said last-named means being operative from the surface, said recording means including a stylus and a chart holder for carrying a chart, means for holding said stylus in marking relation to the chart, a motion transmitting connection between said recording means and said pressure responsive device for making a continuous record of the pressure measured by said pressure responsive device, and means for effecting relative motion between said stylus and chart holder independently of said pressure responsive device, said recording means also including means responsive to the motion of said mass relative to the case for effecting movement of said stylus over said chart independently of the relative motion of the stylus and chart holder responsive to said pressure responsive device and independently of the aforementioned means for effecting said relative motion for making a distinctive marking on the chart to provide a correlation with said condition.

8. A subsurface bore hole instrument, comprising a case adapted to be lowered into a bore hole, a temperature responsive device in said case, a recording means positioned in said case, a mass positioned in said case, means for moving said mass relative to said case, said means for moving said mass being operative from the surface, said recording means including a stylus and a chart holder for carrying a chart, means for holding said stylus in marking relation to said chart, a motion transmitting connection between said recording means and said device for making a continuous record of the temperature measured by said responsive device, and means for effecting relative motion between said stylus and chart holder independently of said temperature responsive device, said recording means also including means responsive to the motion of said mass for effecting movement of said stylus over said chart independently of the relative motion of the stylus and chart holder responsive to the temperature responsive device, and independently of the aforementioned means for effecting said relative motion for making a distinctive marking on the chart to provide a correlation with said condition.

9. A subsurface bore hole instrument, comprising a case adapted to be lowered into a bore hole, a condition responsive device in said case responsive to a condition in the bore hole, a recording means positioned in said case, said recording means comprising a marking element and a chart holder element for carrying a chart, means for holding said marking element and chart in marking relation to each other, means for moving said marking element and chart holder element relative to each other, said last-named means including a motion transmitting connection between said recording means and said condition responsive device for moving one of said elements and including also means for independently moving the other of said elements, a mass positioned in said case, means for moving said mass relative to the case, said last-named means being operative from the surface, and said recording means also including means responsive to the motion of said mass for effecting movement of said elements relative to each other independently of the relative motion of said marking element and said chart holder responsive to actuation by said condition responsive device for making a distinctive marking on the chart to provide a correlation with said condition.

10. A subsurface bore hole pressure gage, comprising a case adapted to be lowered into a bore hole, a pressure responsive device in said case, a clock in said case, a recording means adapted to make a continuous record of pressure, said recording means including a marking element and a chart holder element for carrying a chart, means for moving said elements relative to each other, said moving means including a motion transmitting connection between said recording means and the pressure responsive device for moving one of said elements, a motion transmitting connection between said recording means and the clock for moving the other of said elements, and said moving means also including a mass positioned in said case, means actuatable from the surface for moving said mass relative to the case, and said recording means including also means responsive to the motion of said mass for effecting movement of said elements relative to each other independently of the relative motion of the said elements in response to the actuation by said device for making a distinctive marking on the chart to provide a correlation with said condition.

11. A subsurface bore hole temperature gage, comprising a case adapted to be lowered into a bore hole, a temperature responsive device in said case, a clock in said case, a recording means adapted to make a continuous record of temperature, said recording means including a marking element and a chart holder element for carrying a chart, means for moving said elements relative to each other, said moving means including a motion transmitting connection between said recording means and the temperature responsive device for moving one of said elements, a motion transmitting connection between said recording means and the clock for moving the other of said elements, and said moving means also including a mass positioned in said case, means actuatable from the surface for moving said mass relative to the case, said recording means including also means responsive to the motion of said mass for effecting movement of said elements relative to each other independently of the relative motion of the said elements in response to the actuation by said device for making a distinctive marking on the chart to provide a correlation with said condition.

12. A subsurface bore hole instrument, comprising a case, a clock at one end of said case, a screw, connections for rotation of said screw by said clock, a travelling nut on said screw, a chart holder for carrying a chart, a resilient suspension between said chart holder and said nut, a stylus in operative relation to said chart holder, a device in said case responsive to a condition in said bore hole connected to said stylus, and means communicating with the surface for effecting movement of said chart holder upon its resilient suspension to effect a distinctive marking of the chart.

13. A subsurface bore hole gage, comprising a case adapted to be lowered into a bore hole, a pressure responsive device in said case, a recording means in said case, said recording means including a marking means and a resiliently mounted chart carrier for holding a chart, means actuatable by said pressure responsive device for moving said marking means and said chart carrier relative to each other, independent means for effecting a second relative movement between said marking means and said carrier, and means communicating with the surface for effecting movement of said chart carrier upon its resilient mounting to effect a distinctive marking of the chart.

14. A subsurface bore hole gage, comprising a case adapted to be lowered into a bore hole, a temperature responsive device in said case, a recording means in said case, said recording means including a marking means and a resiliently mounted chart carrier for holding a chart, means actuatable by said temperature responsive device for moving said marking means and said chart carrier relative to each other, independent means for effecting a second relative movement between said marking means and said carrier, and means communicating with the surface for effecting movement of said chart carrier upon its resilient mounting to effect a distinctive marking of the chart.

15. A subsurface bore hole instrument comprising a case adapted to be lowered into a bore hole, a condition responsive device, a recording means including an element for carrying a chart and a stylus element for marking said chart, means responsive to said device for effecting relative movement between said elements in response to changes in the condition, independent means for effecting relative movement between said elements, means for resiliently suspending one of said elements, and means for effecting an oscillation of the last mentioned element upon its resilient suspension to impress a distinctive marking upon the chart.

16. An instrument as defined in claim 15 wherein the last named means communicates with the surface.

17. A subsurface bore hole instrument, comprising a case adapted to be lowered into a bore hole, a bore hole condition responsive device in said case responsive to a condition in the bore hole, a recording means including a chart holder and a stylus, the relative position of said chart holder and stylus being responsive to said condition responsive device, a resiliently suspended inertial means positioned in said case, an electrically operated means including a circuit connected with said recording means for making a distinctive mark independent of said condition responsive device, means in said circuit controlled by said inertial means for actuating said circuit in response to movement of said resiliently suspended inertial means relative to said case, and means actuatable from the surface to vary the acceleration of said inertial means on its resilient suspension.

18. A subsurface bore hole instrument, comprising a case adapted to be lowered into a bore hole, a bore hole condition responsive device in said case responsive to a varying condition in the bore hole, a recording means in said case comprising a chart-mounting element and a stylus element in marking relation to said chart-mounting element, an operative connection between said stylus and said condition responsive device for moving said stylus in a horizontal direction, means for vertically and resiliently suspending said chart-mounting in said case, and means communicating with the surface for selectively effecting reciprocation of the resiliently suspended chart-mounting.

19. A subsurface bore hole instrument, comprising a case adapted to be lowered into a bore hole, a bore hole condition responsive device in said case responsive to a condition in said bore hole, a recording means in said case comprising a recording stylus and a mounting for carrying a chart in marking relation with said stylus, an operative connection between said condition responsive device and said recording means to effect relative movement between said stylus and chart mounting in response to said condition, selectively operable means contained within said case and cooperating with said recording means to effect a distinctive marking of said chart, and means communicating with the surface for controlling the actuation of said selectively operable means, said selectively operable means being thereby operatively controlled from the surface.

20. A subsurface bore hole instrument, comprising a case adapted to be lowered into a bore hole, a bore hole condition responsive device in said case responsive to a condition in the bore hole which changes with depth, a recording stylus operatively connected to said condition responsive device and responsive thereto, a mounting for carrying a chart in marking relation to said stylus, selectively operable means independent of said condition responsive device contained within said case and cooperating with said recording means to effect a distinctive marking of said chart, and communicating means extending to the surface for controlling the actuation of said selectively operable means, said selectively operable means being thereby operatively controlled from the surfaces to enable a correlation of said condition with depth.

21. A subsurface bore hole instrument comprising a case adapted to be lowered into a bore hole, a bore hole condition responsive device in said case responsive to a condition in the bore hole, a recording means positioned in said case including a chart holder element and a stylus element positioned in marking relation with said chart holder, an operative connection between said condition responsive device and said recording means for effecting relative movement between said stylus and chart holder to form a mark correlatable with said condition, a mass mounted in said case, a resilient suspension for said mass, means responsive to the acceleration of said mass and cooperating with said recording means to make a mark distinguishable from said correlatable mark, and means communicating with the surface for selectively effecting acceleration of said mass.

22. A subsurface bore hole instrument, comprising a case adapted to be lowered into a bore hole, a bore hole condition responsive device in said case responsive to a condition in the bore hole, a recording means positioned in said case, said recording means including a stylus element and a chart holder element, an operative connection between said condition responsive device and said recording means for moving said elements with respect to each other in a line having a component of horizontal direction responsive to said condition, means operating independently of said condition responsive device to move said stylus with respect to said chart holder in a line extending at an angle to the direction of relative motion of said stylus and said chart holder responsive to the said device, and means communicating with the surface for controlling and selectively effecting operation of said last mentioned means.

23. A subsurface bore hole instrument, comprising a case adapted to be lowered into a bore hole, a bore hole condition responsive device in said case responsive to a condition in the bore hole, a recording means positioned in said case, said recording means including a stylus element and a chart holder element, an operative connection between said condition responsive device and said recording means for moving said elements with respect to each other in a line having a component of horizontal direction responsive to said condition, independent means separate from the said condition responsive device for moving said stylus and chart holder relative to each other in a vertical direction, said independent means including a motion transmitting means connected to the said recording means for effecting said relatively vertical motion, and means communicating with the surface for controlling and selectively actuating said independent means.

References Cited in the file of this patent

UNITED STATES PATENTS

| Number | Name | Date |
|---|---|---|
| 1,837,222 | Kannenstine | Dec. 22, 1931 |
| 1,946,576 | Dunn et al. | Feb. 13, 1934 |
| 2,015,851 | Herrick et al. | Oct. 1, 1935 |
| 2,213,802 | Hugel | Sept. 3, 1940 |
| 2,216,374 | Martin | Oct. 1, 1940 |
| 2,265,098 | Bettis | Dec. 2, 1941 |
| 2,268,682 | Webb | Jan. 6, 1942 |
| 2,396,724 | Spilhaus | Mar. 14, 1946 |
| 2,593,285 | Fay et al. | Apr. 15, 1952 |
| 2,602,331 | Moosman | July 8, 1952 |